United States Patent
Chapman et al.

(10) Patent No.: US 7,468,111 B2
(45) Date of Patent: Dec. 23, 2008

(54) METHOD AND APPARATUS FOR BALANCING TIRES DURING RETREADING

(75) Inventors: Martin C. Chapman, Greer, SC (US); David L. Pressley, Taylors, SC (US); Jean-Jacques Chateau, Piedmont, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 419 days.

(21) Appl. No.: 11/148,203

(22) Filed: Jun. 9, 2005

(65) Prior Publication Data

US 2005/0279443 A1 Dec. 22, 2005

Related U.S. Application Data

(63) Continuation of application No. PCT/US03/38663, filed on Dec. 5, 2003.

(60) Provisional application No. 60/431,919, filed on Dec. 9, 2002.

(51) Int. Cl.
*B29D 30/54* (2006.01)

(52) U.S. Cl. .......... 156/75; 152/154.1; 156/96; 156/130

(58) Field of Classification Search .......... 156/75, 156/96, 130, 123, 405.1, 406.4; 152/154.1
See application file for complete search history.

(56) References Cited

U.S. PATENT DOCUMENTS

| | | | | |
|---|---|---|---|---|
| 3,874,974 A | * | 4/1975 | Simmons, Jr. ........ | 156/353 |
| 3,944,458 A | * | 3/1976 | Branick ............... | 156/412 |
| 4,004,958 A | * | 1/1977 | Jones et al. ........... | 152/564 |
| 6,579,389 B1 | * | 6/2003 | Kobayashi ............ | 156/64 |
| 2003/0036834 A1 | * | 2/2003 | Kunsch et al. ........ | 701/41 |

FOREIGN PATENT DOCUMENTS

| | | |
|---|---|---|
| DE | 102 28 372 A1 | 2/2003 |
| GB | 1 511 444 | 5/1978 |
| JP | 56 117637 A | 12/1981 |
| JP | 58 093608 A | 6/1983 |
| JP | 09 239864 A | 1/1998 |
| WO | WO 98 53294 A1 | 11/1998 |

OTHER PUBLICATIONS

International Search Report PCT/US03/38663, Mar. 24, 2004.

* cited by examiner

*Primary Examiner*—Geoffrey L Knable
(74) *Attorney, Agent, or Firm*—Frank J. Campigotto; E. Martin Remick; Carolyn G. Uldrick

(57) ABSTRACT

A method and apparatus for balancing a tire during a retreading operation includes measuring the radial runout the buffed tire casing and applying the gum layer and tread strip to compensate for variances in runout. The gum layer is applied so that an overlap or smear is formed at the relative low portion of the casing. The tread strip is applied with the joint at the same low portion in cases where the low portion has a relatively large variance, or at another location if the variance is small or other low portions exist. In addition, the thickness of the gum layer and tread strip may be controlled for further compensation of the runout variance.

4 Claims, 2 Drawing Sheets

METHOD AND APPARATUS FOR BALANCING TIRES DURING RETREADING

This application is a continuation of International Application No. PCT/US03/38663, filed Dec. 5, 2003, which claims the benefit of U.S. Provisional Application No. 60/431,919, filed December 9, 2002.

BACKGROUND AND SUMMARY

The invention relates to tire retreading processes. More specifically, the invention relates to a method and apparatus for balancing a tire during the retread operation.

Producing a uniformly round and balanced tire from a buffed tire casing during the retreading or recapping process is difficult. The worn tire casing may have non-uniformities generated by the stresses during its previous use. The buffing process to remove the worn tread may create out-of-round or radial runout non-uniformities. Further, the original manufacturing process may have built some non-uniformities into the tire casing.

The invention proposes a method and apparatus to apply a new gum layer and tread to a buffed tire casing in a way that compensates for certain non-uniformities present in the tire casing to improve the uniformity of the assembled tire casing and tread. According to the invention, a buffed casing is measured for radial runout and the various relative high and low portions are indexed. The gum layer and tread are applied to the casing in a way that compensates for the radial runout variations. According to a first, preferred embodiment, the casing is positioned so that the gum layer is applied onto the casing beginning at the relatively lowest portion of the crown periphery, and an overlap is formed at this lowest portion. In this way, at least the lowest portion can be partially filled to compensate for the difference in round.

According to another aspect of the invention, the tread strip is applied to the casing so that the joint is positioned at the lowest portion. This provides a heavier or thicker tread layer at the lowest portion of the casing crown, which further compensates for the difference in roundness.

According to yet another aspect of the invention, application of the gum layer may be controlled so that a thicker or thinner layer is applied to the crown proportional to the radial runout variation measurement to compensate for differences in round. The casing with gum applied will have an improved radial runout profile.

Another aspect of the invention involves adjusting the tread strip during application to compensate for radial runout variation. According to this aspect of the invention, the tread strip is stretched as it is applied to the casing so that the thickness of the tread strip is used to compensate for the radial runout variation, the tread being made thinner where the casing radial runout is relatively high and thicker where the casing radial runout is relatively low.

According to another embodiment of the invention, the radial runout measurements of the casing are analyzed as vector quantities and a compensating vector is determined to locate starting points for application of the gum layer and the tread strip. In this embodiment, one or more resultant low portion vectors are determined and indexed for the gum applicator and tread strip applicator. More than one vector may result in cases in which multiple low portions of the same size exist on the tire casing.

BRIEF DESCRIPTION OF THE DRAWINGS

The invention will be better understood by reference to the following detailed description read in conjunction with the appended drawings, in which.

DETAILED DESCRIPTION

Figure 1:
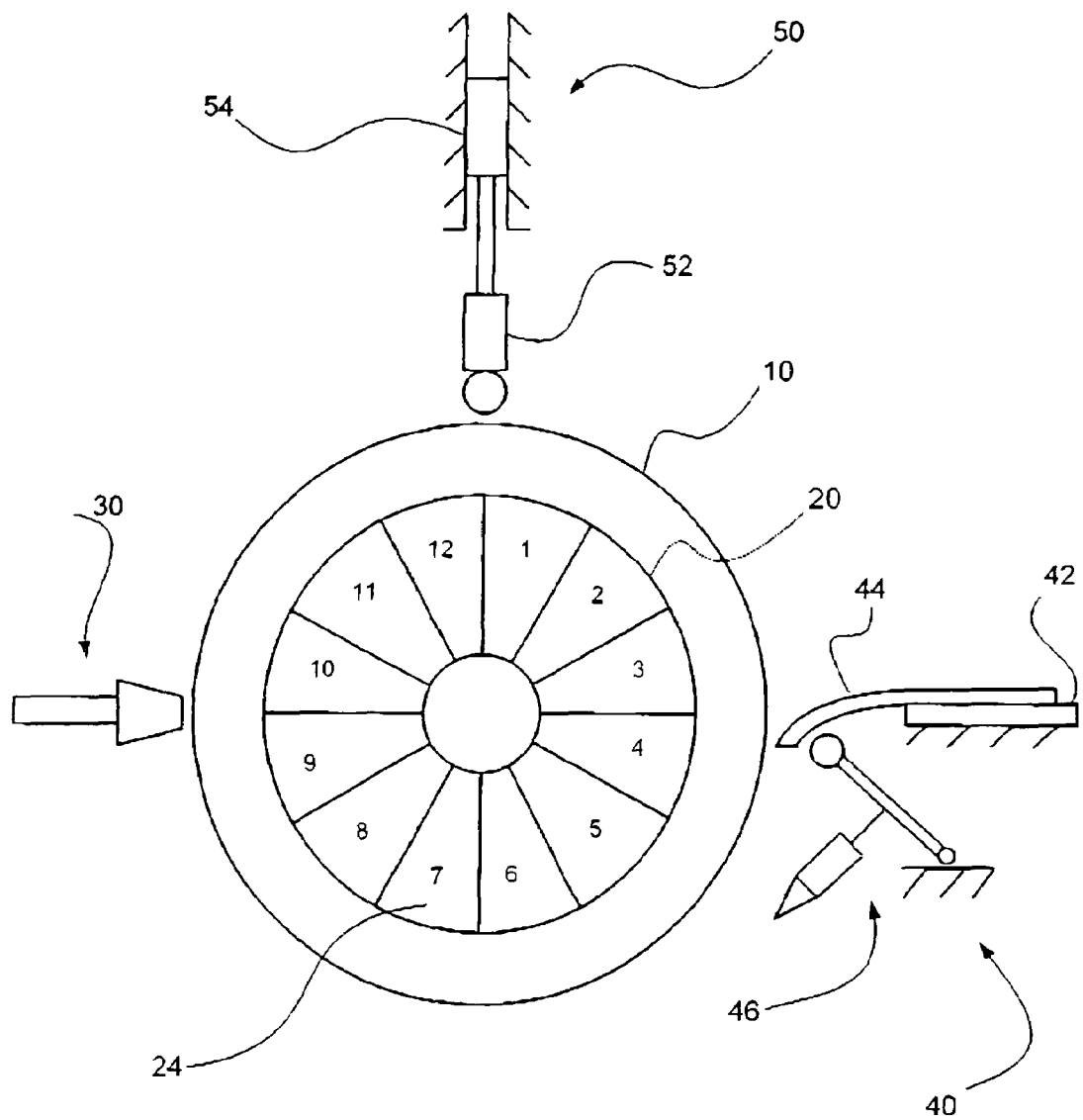
FIG. 1 is a schematic diagram of an apparatus in accordance with the invention.

A schematic diagram of an apparatus in accordance with the invention is shown in FIG. 1. A controller (not illustrated) will control the various components of the apparatus as described below. The controller may be any appropriate device, including, but not limited to, a programmed logic controller (PLC) or other microprocessor control system.

A buffed tire casing 10 is shown mounted on a rotatable mounting rim 20. The mounting rim 20 will expand to engage the tire casing bead and to create an air seal. An inflation supply connection (not shown) will provide air under pressure to inflate the casing. The mounting rim 20 includes a shaft 22 for controlled rotation of the rim. The mounting rim 20 is divided into sectors 12 which are indexed for control of the orientation of the rim. Numbers are shown on the sectors in FIG. 1 for the purposes of illustration. Having 12 sectors is for convenience; more or fewer sectors may be used.

As in a conventional tire building apparatus, the apparatus in accordance with the invention includes an applicator 30 for applying a layer of uncured gum rubber, or cushion gum, to the crown of the buffed casing 10. The applicator may be configured to apply gum as a layer from a roll, as an extruded product, or a sprayed on product. The invention relates not to the particular type of gum or its application, but to the control of the starting and end point of application and the thickness of the layer applied.

The apparatus also includes a tread installing device 40. The tread installing device 40 may include a conveyor 42 to advance the tread strip 44 to the tire casing 10, and a roller device 46 for tensioning the tread strip as it is applied. Tread installation devices are known to those skilled in the art, for example, from U.S. Pat. No. 5,427,636, the content of which is incorporated herein by reference for all it discloses.

A radial runout measuring device 50 is mounted in proximity to the tire crown and is positionable to measure the radial runout or roundness of the buffed tire crown. In a current embodiment, the radial runout measuring device is a proximity sensor having a roller for contacting the tire crown. The proximity sensor will produce a signal proportional to changes in the distance of the tire crown from a reference point, thus quantifying relative high and low portions of the tire crown. Other sensor devices could be employed, for example, sensors using light or sound waves that detect the surface of the tire crown relative to a reference point. A slide device, for example, an air cylinder, positions the illustrated proximity sensor 52 in contact with the tire crown. The controller indexes the measurements to the appropriate circumferential position on the casing.

In operation, the buffed tire casing 10 is mounted on the mounting rim 20 and inflated to a pressure sufficient to make the tire casing firm enough to resist deformation from the forces of applying the gum and tread strip. Typically, about one bar pressure is sufficient. The proximity sensor 52 is moved into contact with the crown. The tire casing 10 is then rotated one complete revolution while the proximity sensor 52 measures radial runout of the crown and provides a proportional signal to the controller. The controller, based on the signal, indexes the relative high and low portions of the tire casing 10.

In a current embodiment the circumference of the tire casing is divided into twelve sectors for data handling purposes, which facilitates using an analog proximity sensor. The radial runout signal for each sector is averaged, and the controller identifies the relative high and low sectors. Of course, fewer or more sectors could be used depending on the amount of precision desired for characterizing the crown runout.

Alternatively, using continuous radial runout measurement data, the controller could itself define sectors of the circumference corresponding to relative high and low portions and define the length of the sectors based on the data. Such a control scheme permits variable length sectors, which would provide for better control of the compensating application of the gum layer thickness and tread thickness.

Figure 2:
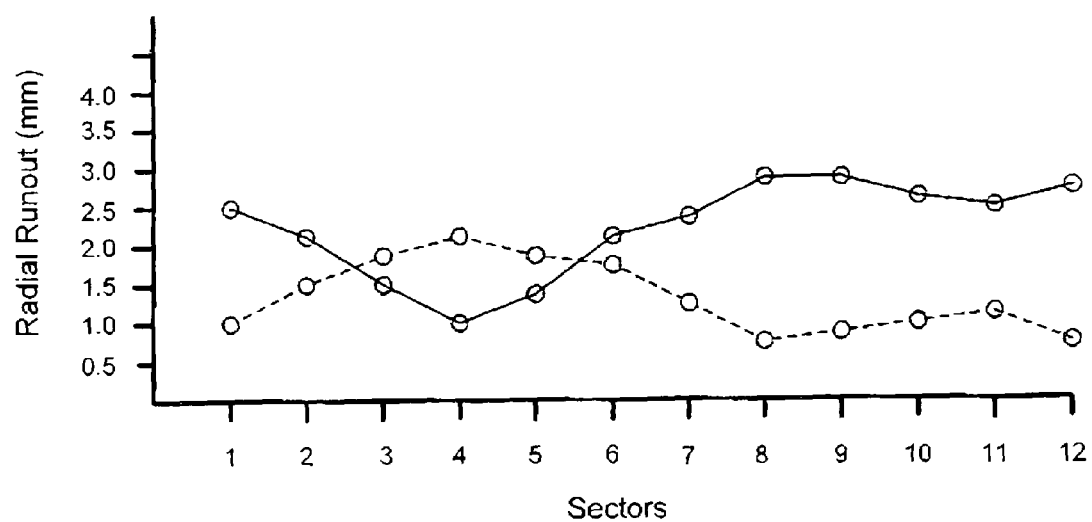
FIG. 2 is a graph showing a radial runout measurement for an exemplary tire casing, and a compensating thickness profile for a layer of gum.

FIG. 2 is a graph showing an exemplary radial runout measurement (indicated by the solid line) of a buffed tire. The radial runout variance for the twelve sectors shows that the portions including sectors 2 through 6 are relatively low and about sectors 1 and 7 through 12 are relatively high. Note that a local low point exists at about sector 11.

Based on the measurements of radial runout of the tire casing, the controller positions the tire casing with the minimum low sector (sector 4 in FIG. 2) at the gum applicator 30. According to a first embodiment, the gum applicator 30 applies a layer of gum to the casing crown that begins and ends at this minimum position, and includes a gum layer overlap at the sector. In this way, a thicker layer is applied at this relatively lowest portion, which helps compensate for the radial runout variance at this location.

According to another embodiment of the invention, the gum applicator will, under control of the controller, vary the thickness of the gum layer as it is applied responsive to the radial runout measurement data from the sectors. FIG. 2 shows a compensating layer thickness (indicated by the broken line) of gum as might be applied to the exemplary tire. The gum layer thickness corresponds inversely to the radial runout variance of the tire casing, being thicker in sectors 2 through 6 and thinner in sectors 1 to 2 and 7 through 12. Note the slight local increase in thickness of the gum layer at sector 11, as compared to adjacent sectors, to compensate for the relative low measurement at sector 11.

An extruder gum applicator, which handles heated gum material, can adjust the pressure and flow rate of the gum to control the thickness of the layer being applied. For an applicator feeding a gum strip, which is typically ambient temperature, the applicator would include rollers for controlling a stretch of the strip to achieve the correct thickness.

Following application of the gum layer, the controller causes the mounting rim 20 to rotate to position the tire casing 10 with a gum layer for application of the tread strip 44. In a preferred embodiment of the process, the tire casing 10 is rotated so that the leading edge of the tread strip is applied at the minimum low portion. Thus, when the tread strip is completely applied, a tread joint will be formed at this location. Because the tread joint is typically applied with compression to hold the edges of the joint together, the tread is heavier at the joint than at other parts of the tread. This will also help compensate for the relative low point of the tire casing.

In addition, the tread installer can be controlled to stretch the tread as it is applied to the casing to control the thickness of the tread responsive to the measured radial runout. Thus, similar to the process as described for the gum layer, the tread thickness will vary inversely with the radial runout variance to improve the roundness of the built tire. Apparatuses capable of stretching a tread strip during installation on a tire casing are known to those skilled in the art, for example, as in U.S. Pat. No. 5,427,636 to Chabin et al. The invention adds to such a device the control of stretching in response to the radial runout of the casing.

Variations of the method can be made, for example, in casings where the casing has two low portions of relatively equal size, the gum layer overlap could be formed on one and the tread joint formed at the other low portion. For casings that have little radial runout variance, the gum overlap and tread joint may be positioned at 180 degrees, with one positioned at the lowest portion.

Further, if the radial runout measurement is analyzed as vector quantities, the position of the gum and/or the tread joint could be determined so that a resultant vector compensates for the radial runout vector.

The inventors have found that compensation of radial runout of a buffed casing improves the uniformity of the casing both statically and dynamically (during rotation under load). Thus, the method of the invention provides a simple process for improving the uniformity of retreaded tires.

Variations and changes to the described method and apparatus may be made without departing from the scope of the invention as defined in the appended claims.

What is claimed is:

1. A method for balancing a tire during retreading, comprising the steps of:
    measuring radial runout of a buffed crown of a tire casing to determine relative high and low portions of the buffed crown, the high and low portions creating non-uniform roundness of the buffed tire casing;
    applying a gum layer to the buffed crown, a thickness of the gum layer varying circumferentially as it is applied under a control responsive to the measured radial runout of the buffed crown, wherein the varied thickness of the gum improves the buffed tire casing roundness; and
    installing a tread strip on the crown beginning at a low portion of the buffed crown so that a tread joint is formed at a position responsive to the determined relative high and low portions of the buffed crown.

2. The method according to claim 1, wherein the step of applying the gum layer includes forming an overlap in the gum layer at the low portion of the buffed crown.

3. The method according to claim 1, wherein the step of applying the gum layer includes applying the gum layer in a thickness proportional to the determined high and low portions.

4. The method of claim 1, further comprising stretching the tread strip during installation to control thickness of the strip on the crown proportional to the determined high and low portions of the crown.

* * * * *